United States Patent

[11] 3,583,576

| [72] | Inventor | Franklin D. Lakins<br>Syracuse, N.Y. |
|---|---|---|
| [21] | Appl. No. | 825,674 |
| [22] | Filed | May 19, 1969 |
| [45] | Patented | June 8, 1971 |
| [73] | Assignee | Alfreda B. Lakins, surviving spouse of said Franklin D. Lakins, deceased |

[54] BAR TRANSFER APPARATUS
2 Claims, 4 Drawing Figs.

| [52] | U.S. Cl. | 214/1 |
|---|---|---|
| [51] | Int. Cl. | B65g 65/02 |
| [50] | Field of Search | 214/1 P, 1 P2, 1, 1 B2, 34 |

[56] References Cited
UNITED STATES PATENTS

| 647,347 | 4/1900 | Wellman et al. | 214/34 |
|---|---|---|---|
| 1,925,194 | 9/1933 | Long | (214/34UX) |
| 2,259,168 | 10/1941 | Lamprecht | 214/1(P) |
| 3,239,088 | 3/1966 | Sano | 214/34X |

*Primary Examiner*—Gerald M. Forlenza
*Assistant Examiner*—Frank E. Werner
*Attorney*—John R. Varney

ABSTRACT: A bar transfer apparatus for moving bar stock from a work infeed storage rack and removing one piece of stock therefrom, prepositioning one end thereof and clamping the bar in a vise, moving the vise along a track and then moving the track horizontally, inserting the bar stock into a clamping fixture within a machine using bar stock as a raw material.

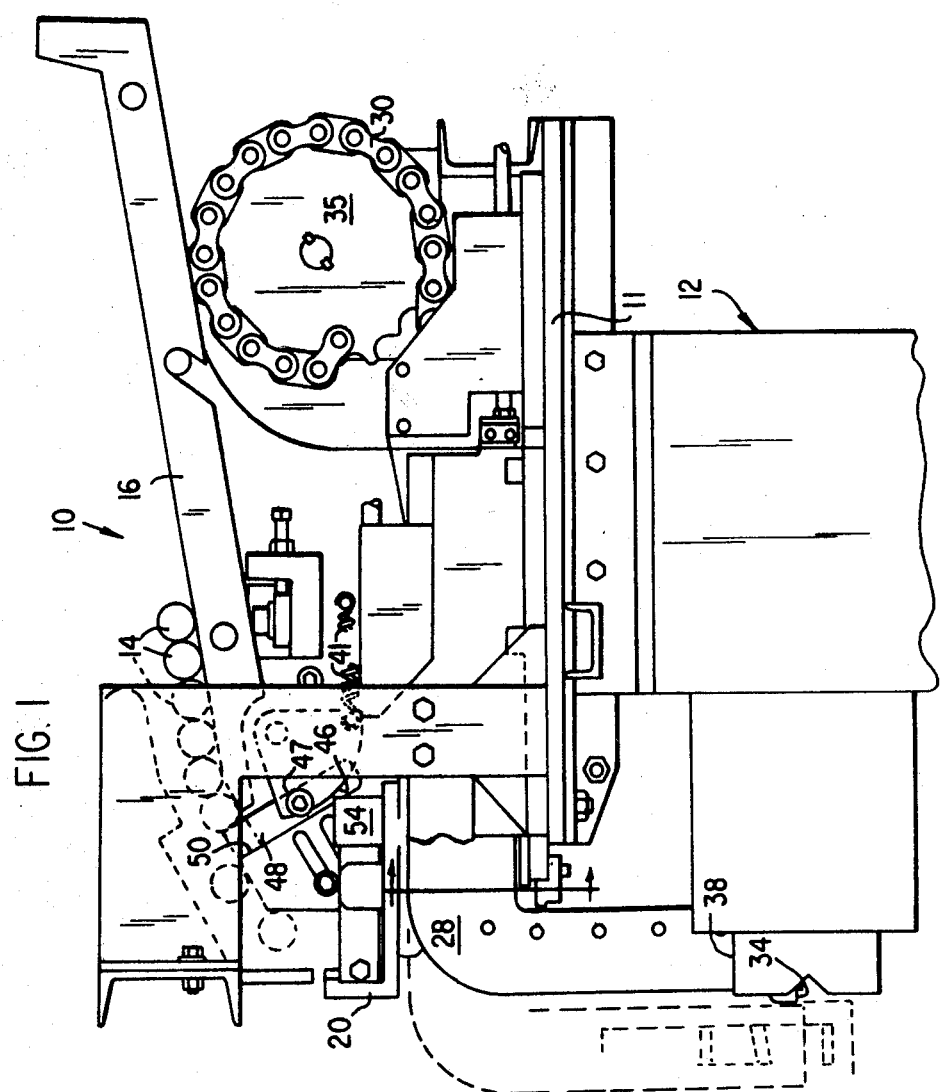
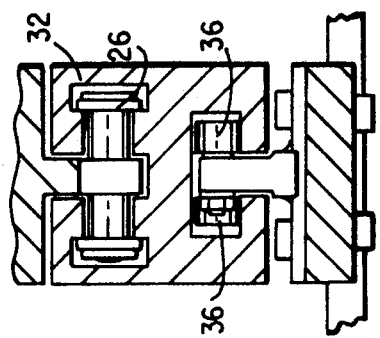
INVENTOR.
FRANKLIN D. LAKINS
BY John R. Varney
ATTORNEY.

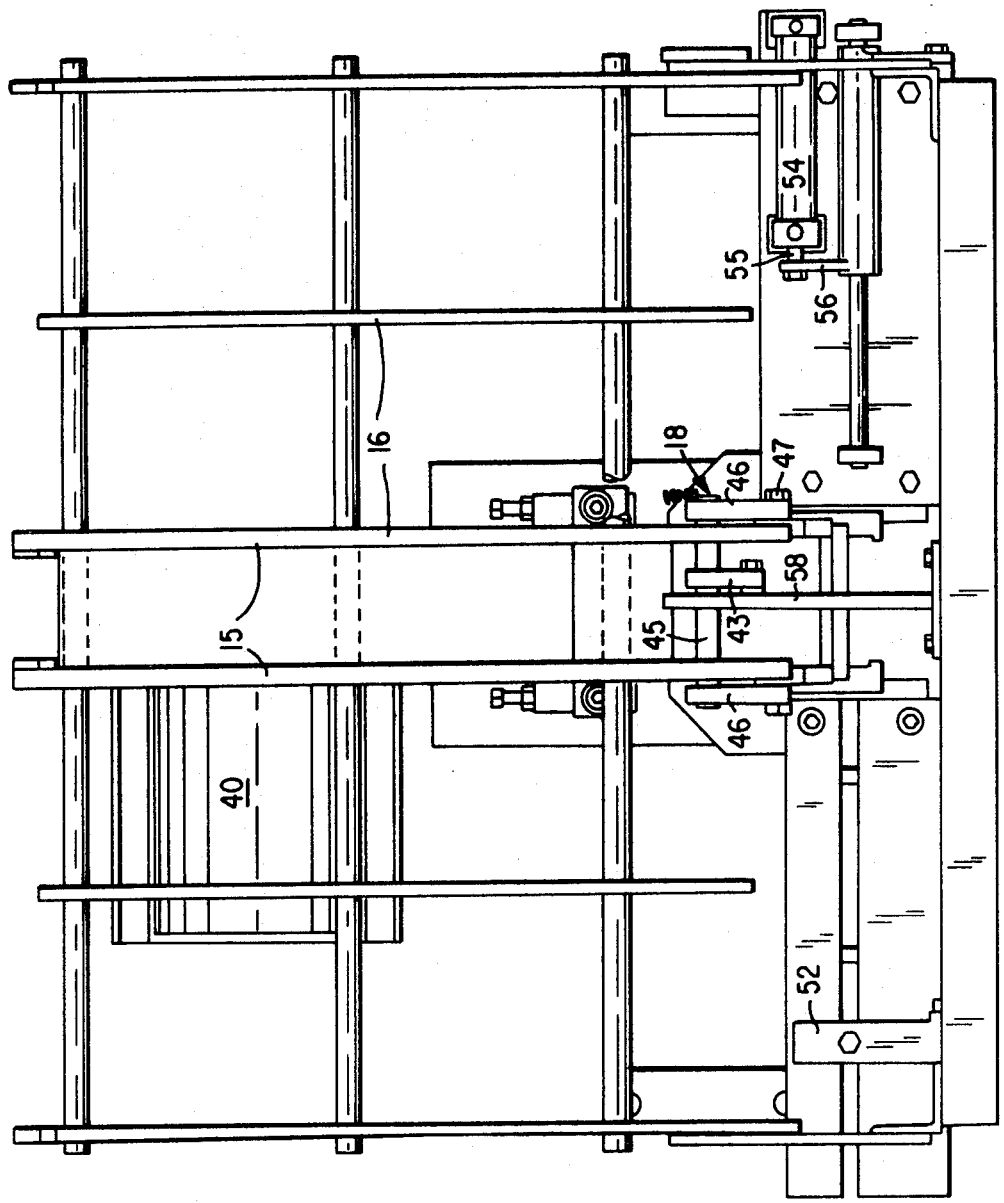

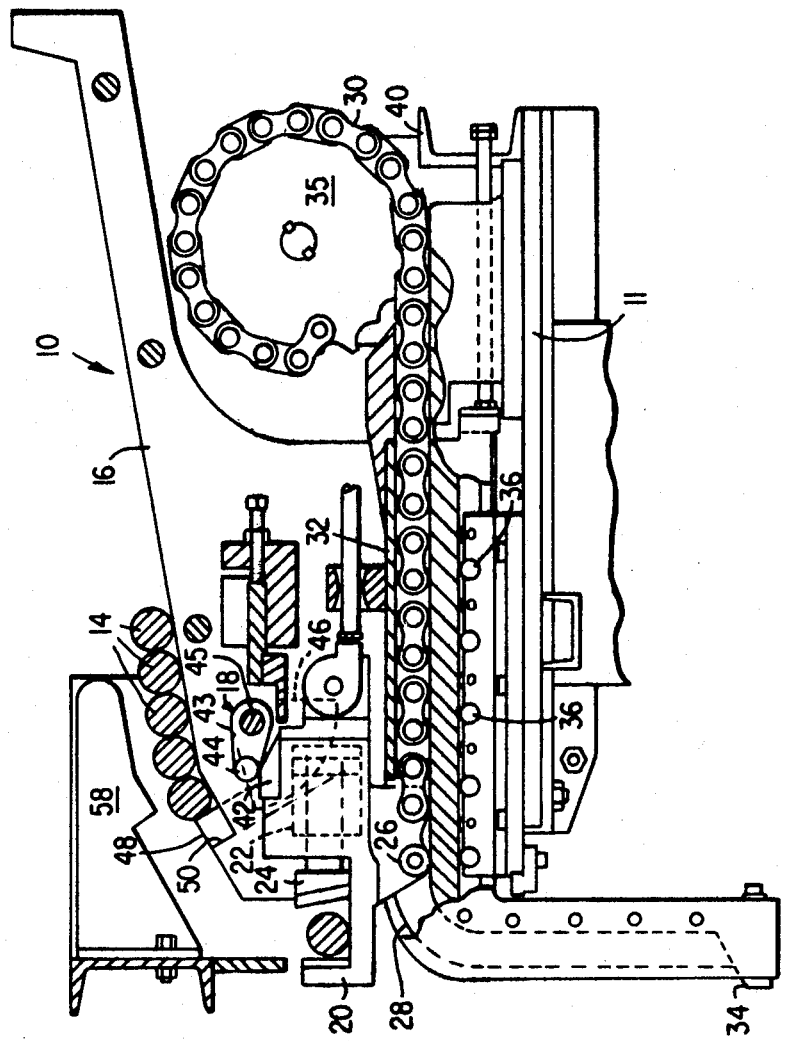

BAR TRANSFER APPARATUS

BACKGROUND OF THE INVENTION

Many apparatuses for performing work operations on bar stock require bar stock to be inserted horizontally therein. This requirement of insertion horizontally, heretofore limited the operation to manual loading. This limits the operation to that within human capabilities which is very slow in comparison with todays high production machines. The problem of moving bar stock from a rack to insertion in a machine to perform work thereon required that the infeed rack output end be at the same level as that of the securing members on the machine. In the machines to which this invention is applied, it is impossible to have the workpiece inserted completely in a horizontal movement. Thus, the bar stock must be lowered between fixtures of the machine before it can be horizontally inserted into the securing mechanism of the machine.

SUMMARY OF THE INVENTION

As disclosed herein the preferred embodiment of this invention is a mechanism for moving raw bar stock from an infeed rack to a machine, along a prescribed path dictated by the structure of the machine into which the bar stock is to be inserted. There is an infeed rack from which one bar is ejected and moves into the jaws of a vise, and is endwise positioned and clamped. The vise securely clamped, is pushed along a track by a roller chain connected to and wrapped around a sprocket rotatably driven by a motor. The vise following the track completes a 90° turn, moves vertically downward and abuts a stop, further turning of the sprocket moves the vise and track, which is mounted on rollers, horizontally forward until the workpiece abuts clamping members of the machine. At this position the raw bar stock is in the machine or apparatus which performs a production operation thereon. The machine clamps the raw bar and the vise releases and the track retracks horizontally and then the vise proceeds back along the track to the position adjacent to the infeed rack awaiting the indexing of the next raw piece of bar stock and removal of the bar stock, which has had work completed thereon, from the machine.

BRIEF DESCRIPTION OF THE DRAWINGS

FIG. 1 is a side plan view of the apparatus of this invention, secured to the top of a machine using bar stock in its operation thereof;

FIG. 2 is a top view of the apparatus shown in FIG. 1;

FIG. 3 is a side view with parts broken away to show the operation parts thereof, and;

FIG. 4 is a sectional view taken along lines 4—4 of FIG. 1.

DESCRIPTION OF THE PREFERRED EMBODIMENT

As shown in FIG. 1 there is a bar transfer apparatus 10 having a baseplate 11 secured to the top of a machine 12 into which apparatus 10 inserts the workpiece 14 to have work performed thereon. Apparatus 10 comprises an inclined infeed work rack 16 on to which raw bar stock or workpieces 14 are positioned. Work rack 16 is made up of two support plates 15 held in space relation to each other and secured on baseplate 11. Passing through support plates 15 and four bars spaced from the plates 15 and each other are three rods, together which form the supporting structure for the infeed bar stock.

Adjacent the low end of the infeed rack 16 there is an indexing mechanism 18, to be more fully explained later, which moves one workpiece from rack 16 and allows the workpiece to drop into vise 20 positioned under the index mechanism. With the workpiece in the open vise it is axially moved to preposition one end. On opening of the work-clamping device of machine 12 and the dropping out of the completed workpiece, vise 20 clamps the workpiece 14 by an air cylinder 22 built within the vise base which moves jaw 24 of the vise.

Upon clamping the workpiece, the vise 20 which is mounted upon rollers 26 in track 28, moves to the left as seen in FIGS. 1 and 3. The vise is moved by double roller chains 30 pushing against it, the chain being supported in a chain guideway 32. The chain in turn is moved by two sprockets 35 turned by a fluid motor 40.

Track 28 is L-shaped and allows the vise to move to the left and downwardly until it abuts stop member 34 on the end of track 28. The roller chains 30 actually push the vise, this is accomplished by the fact that the chains 30, upon leaving sprockets 35, fit within the chain guideway 32. This guideway of channel prevents the chain from buckling as it normally would, if not confined within a guide channel. When the vise abuts stop member 34, further clockwise turning of the sprockets 35 unwind the chain therefrom, pushing vise 20 and its L-shaped track 28 which is also mounted on rollers 36, as seen in FIG. 3 and 4, and the vise 20 and track 28 move to the left.

The transfer apparatus 10 has moved a workpiece from rack 16, horizontally and then downwardly and again horizontally inserting the workpiece into the clamping fixture 38 of the machine 12 which will perform a production operation thereon. Upon clamping by the machine 12 vise 20 opens and motor 40 is reversed turning counterclockwise and the track member 28 returns to its original retracted position and further turning counterclockwise pulling on chains 30 tows the vise back up and to the right, as seen in FIG. 1 and 3, in track 28 returning the vise to its position under the indexing mechanism. As described this apparatus just inserts the workpiece into machine 12, the workpiece is discharged from the clamping fixture 38 by gravity on to a conveyor system. It will be easily understood that this apparatus may also remove the workpiece from machine 12 and at some point on its return toward its loading position, stop at an unloading station and have the workpiece removed either manually or mechanically.

On top of vise 20 as more clearly shown in FIG. 3 there is an inclined plain cam 42. Pivotedly supported from support plates 15 of rack 16 there is a trailing arm 43 and cam follower 44 which are mounted on a shaft 45, each end of the shaft, has secured thereto, on the outside of plates 15, arms or segments 46 which in turn engages studs 47 secured in index members 48 which are slidably mounted in plates 15. When vise 20 is not in the loading or home position the cam follower 44 is urged down against stop 39 by spring 41 allowing the index members 48 to stay down. The work members on rack 16 slide or roll against stop 50, in this position a workpiece is sitting on the ends of indexing members 48. As the vise 20 homes the cam follower 44 rides up cam 42, in doing so rotates shaft 45 and the segments 46 secured thereto push on the indexing members 48 raising one workpiece to a position where it no longer abuts stop 50 and rolls or slides into the open jaws of vise 20.

Positioned on opposite sides of the vise is an alignment member 52 and a fluid cylinder 54. Cylinder 54 and alignment member 52 are mounted on a frame which is supported by L-shaped plates secured to baseplate 11. The alignment member 52 and arm 56 secured to piston rod 55 are positioned to be in alignment with the ends of a workpiece when it is in vise 20. The alignment member 52 and cylinder 54 are positioned to put one end of the workpiece 14 at an exact position for insertion in machine 12. The alignment member 52 is adjustable to accommodate various desired end positions so it may be prepositioned and secured so that all bars thereafter abutting it will be in the same axial position entering machine 12. The hydraulic cylinder 54 and piston rod 55 with arm 56 move towards the end of the bar pushing the opposite end into abutting relationship with alignment member 52. As each enters vise 20, cylinder 54 moves to position the end against the alignment member 52, before the vise 10 clamps the workpiece therein.

Secured to the frame, supporting alignment member 52 and cylinder 54 is guide member 58, positioned over vise 20, which is adjustable to be moved up and down according to the size of workpiece. The guide 58 is adjusted down close enough to the workpieces in rack 16 to prevent the bars from passing over one another. This guide prevents the weight of the workpieces, when the rack is fully loaded from passing over stock positioned on the indexing member 48.

I claim:

1. In a bar stock handling apparatus: the combination of an inclined infeed bar stock supporting fixture, an indexing stop mechanism, a vise having parallel and upright clamping surfaces for receiving and clamping a workpiece received from said indexing stop, means moving said vise and the workpiece clamped therein along an L-shaped track and moving said track and vise forward wherein said forementioned upright surfaces of the vise are now horizontal, a workpiece receiving apparatus wherein upon forward movement of said vise, said vise inserts the workpiece into the work receiving apparatus, and wherein said receiving apparatus secures said workpiece and said vise opens and retracts horizontally and then back along the L-shaped track to the forementioned position wherein said vise clamping surfaces are upright and parallel ready to receive the next workpiece indexed therein.

2. A bar stock handling apparatus as in claim 1, wherein said means moving said vise along the L-shaped track is a pushing action with a roller chain, said chain being moved by a reversible drive motor.

UNITED STATES PATENT OFFICE
CERTIFICATE OF CORRECTION

Patent No. 3,583,576            Dated June 8, 1971

Inventor(s) Franklin D. Lakins

It is certified that error appears in the above-identified patent and that said Letters Patent are hereby corrected as shown below:

On the cover sheet, cancel "[73] Assignee Alfreda B. Lakins, surviving spouse of said Franklin D. Lakins, deceased".

Signed and sealed this 8th day of May 1973.

(SEAL)
Attest:

EDWARD M. FLETCHER, JR.            ROBERT GOTTSCHALK
Attesting Officer            Commissioner of Patents